United States Patent
Howard

(10) Patent No.: US 10,323,937 B2
(45) Date of Patent: Jun. 18, 2019

(54) SYSTEM AND METHOD OF DETERMINING TOP-DEAD-CENTER (TDC) OF RECIPROCATING COMPRESSOR

(71) Applicant: General Electric Company, Schenectady, NY (US)

(72) Inventor: Brian Francis Howard, Reno, NV (US)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 15/134,150

(22) Filed: Apr. 20, 2016

(65) Prior Publication Data

US 2016/0230755 A1    Aug. 11, 2016

(51) Int. Cl.
  *F04B 49/12*    (2006.01)
  *F04B 49/06*    (2006.01)
  *G01B 13/18*    (2006.01)
  *F04B 39/12*    (2006.01)

(52) U.S. Cl.
  CPC ............ *G01B 13/18* (2013.01); *F04B 39/122* (2013.01); *F04B 49/06* (2013.01); *F04B 49/12* (2013.01); *F04B 2205/03* (2013.01)

(58) Field of Classification Search
  CPC ........ G01B 13/18; F04B 49/12; F04B 39/122; F04B 49/06; F04B 2205/03
  See application file for complete search history.

(56) References Cited

U.S. PATENT DOCUMENTS

| 4,744,243 A | 5/1988 | Tanaka |
| 6,367,317 B1 * | 4/2002 | Jaye ...................... G01M 15/06 |
| | | 73/114.16 |
| 7,117,080 B2 * | 10/2006 | Sobel .................. F02D 35/0007 |
| | | 701/114 |
| 7,506,536 B2 | 3/2009 | Cornwell et al. |
| 2007/0272221 A1 | 11/2007 | Branyon et al. |

(Continued)

OTHER PUBLICATIONS

Groh, Michael R., "Access Bible 2010," John Wiley and Sons, Jun. 28, 2010.

(Continued)

*Primary Examiner* — Paul D Lee
*Assistant Examiner* — Mark I Crohn
(74) *Attorney, Agent, or Firm* — Mintz Levin Cohn Ferris Glovsky and Popeo, P.C.

(57) ABSTRACT

Various embodiments include approaches for determining a top-dead-center (TDC) of a reciprocating compressor. In some cases, an apparatus includes: a pressure transducer configured to measure pressure fluctuations inside a compressor cylinder and convert the pressure fluctuations into an asynchronous waveform; and at least one computing device operably connected with the pressure transducer, the at least one computing device configured to: extract a data set representing piston angles over a single revolution of a piston within the compressor cylinder from the asynchronous waveform; remove data representing invalid piston angles from the data set to form a refined data set; determine an average piston angle for the single revolution from the refined data set; and adjust the refined data set to identify a top-dead-center (TDC) position of the piston within the compressor cylinder.

19 Claims, 7 Drawing Sheets

(56) References Cited

U.S. PATENT DOCUMENTS

2014/0205471 A1 7/2014 Howard
2015/0226642 A1* 8/2015 Urano .................. F02D 41/009
                                                                                                73/114.02

OTHER PUBLICATIONS

Extended European Search Report and Opinion issued in connection with corresponding EP Application No. 16199469.4 dated Jun. 14, 2017.

* cited by examiner

SYSTEM AND METHOD OF DETERMINING TOP-DEAD-CENTER (TDC) OF RECIPROCATING COMPRESSOR

FIELD OF THE INVENTION

The subject matter disclosed herein relates to compressor systems. More particularly, the subject matter relates to diagnostics of compressor systems.

BACKGROUND OF THE INVENTION

A vast majority of diagnostics for reciprocating compressors require data about the mechanical top-dead-center (TDC) position of the compressing piston inside the compressor's cylinder. Other data about the reciprocating compressor is indexed to the TDC position data. Conventional diagnostic approaches for determining this TDC position on a reciprocating compressor require that the compressor be powered off (shutdown). With the compressor shut down, a dial indicator or level may be used to determine the TDC position. With the TDC established, a proximity probe may be installed to view an event on the crankshaft or crosshead. The structure(s) viewed by the proximity probe may be detectable on a once-per-turn or multiple-event-per-turn basis, or a combination thereof. After determining the TDC position and installing the proximity probe, the compressor maybe re-started. The conventional approach relies upon this proximity probe and an event (referred to as a phase-reference transducer) along with requisite wiring connecting the probe and the transducer, to mark TDC for each revolution. Modification of the compressor and/or crankshaft, installation of wiring, and verification of components add expense to the diagnostic system.

Additionally, in conventional approaches, the event data must be collected simultaneously across the pressure transducer and the phase-reference transducer so that the TDC marked by the phase-reference transducer can be accurately related to the pressure transducer. The need for this type of simultaneous data collection nearly excludes wireless transmission of data from the compressor as it can be difficult to ensure simultaneous transmission of data from various points, particularly in industrial environments.

Prior example approaches for determining the TDC of a reciprocating engine include comparing measured event data to a thermodynamic model or comparing measured event data to a model pressure curve ratio. In both cases, the models include pre-supposed information about the engine, and building those models requires additional time and resources, e.g., for development and tuning.

BRIEF DESCRIPTION OF THE INVENTION

Various embodiments include approaches for determining a top-dead-center (TDC) position of a reciprocating compressor. In various particular embodiments, an apparatus is disclosed. The apparatus can include: a pressure transducer configured to measure pressure fluctuations inside a compressor cylinder and convert the pressure fluctuations into an asynchronous waveform; and at least one computing device operably connected with the pressure transducer, the at least one computing device configured to: extract a data set representing piston angles over a single revolution of a piston within the compressor cylinder from the asynchronous waveform; remove data representing invalid piston angles from the data set to form a refined data set; determine an average piston angle for the single revolution from the refined data set; and adjust the refined data set to identify a top-dead-center (TDC) position of the piston within the compressor cylinder.

A first aspect of the invention includes an apparatus having: a pressure transducer configured to measure pressure inside a compressor cylinder and convert the measured pressure into an asynchronous waveform; and at least one computing device operably connected with the pressure transducer, the at least one computing device configured to: extract a revolution data set representing piston angles over a single revolution of a piston within the compressor cylinder from the asynchronous waveform; evaluate a property corresponding to the measured pressure at each piston angle of the revolution data set; determined whether each piston angle of the revolution data set is an invalid piston angle that does not correspond to a top-dead-center (TDC) position of the piston within the compressor cylinder based at least in part on a comparison of the evaluated property from the respective piston angle to a respective threshold; remove data representing invalid piston angles from the data set to form a refined data set; determine an average piston angle for the single revolution from the refined data set; identify the average piston angle representing a data value of the refined data set as the TDC position of the piston within the compressor cylinder; and adjust the refined data set to order the data value of the TDC position of the piston within the compressor cylinder to be a first data value in the refined data set.

A second aspect of the invention includes a system having: at least one computing device configured to identify a top-dead-center (TDC) position of a piston within a compressor cylinder by performing actions including: extracting a revolution data set representing piston angles over a single revolution of the piston within the compressor cylinder from the asynchronous waveform; indicating pressure inside the compressor cylinder; evaluating a property corresponding to the pressure at each piston angle of the revolution data set; determining whether each piston angle of the revolution data set is an invalid piston angle that does not correspond to the TDC position of the piston within the compressor cylinder based at least in part on a comparison of the evaluated property from the respective piston angle to a respective threshold; removing data representing invalid piston angles from the revolution data set to form a refined data set; and identifying a determined piston angle representing a data value of the refined data set as the TDC position of the piston within the compressor cylinder.

A third aspect of the invention includes a non-transitory computer readable media having program code, which when executed on at least one at least one computing device, causes the at least one computing device to identify a top-dead-center (TDC) position of a piston within a compressor cylinder by performing actions including: obtaining an asynchronous waveform indicating measured pressures inside a compressor cylinder; extracting a revolution data set representing piston angles over a single revolution of the piston within the compressor cylinder from the asynchronous waveform; evaluating a property corresponding to the measured pressure at each piston angle of the revolution data set; determining whether each piston angle of the revolution data set is an invalid piston angle that does not correspond to the TDC position of the piston within the compressor cylinder based at least in part on a comparison of the evaluated property from the respective piston angle to a respective threshold; removing data representing invalid piston angles from the revolution data set to form a refined data set; determining an average piston angle for the single revolution from the refined data set; identifying the average piston angle as representing a data value of the refined data set as the TDC position of the piston within the compressor cylinder; and adjusting the refined data set to order the data value of the TDC position of the piston within the compressor cylinder to be a first data value in the refined data set.

A fourth aspect of the invention includes a computer-implemented method performed using at least one computing device, the computer-implemented method including: obtaining an asynchronous waveform indicating measured pressures inside a compressor cylinder; extracting a revolution data set representing piston angles over a single revolution of the piston within the compressor cylinder from the asynchronous waveform; evaluating a property corresponding to the measured pressure at each piston angle of the revolution data set; determining whether each piston angle of the revolution data set is an invalid piston angle that does not correspond to the TDC position of the piston within the compressor cylinder based at least in part on a comparison of the evaluated property from the respective piston angle to a respective threshold; removing data representing invalid piston angles from the revolution data set to form a refined data set; determining an average piston angle for the single revolution from the refined data set; identifying the average piston angle as representing a data value of the refined data set as the TDC position of the piston within the compressor cylinder; and adjusting the refined data set to order the data value of the TDC position of the piston within the compressor cylinder to be a first data value in the refined data set.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
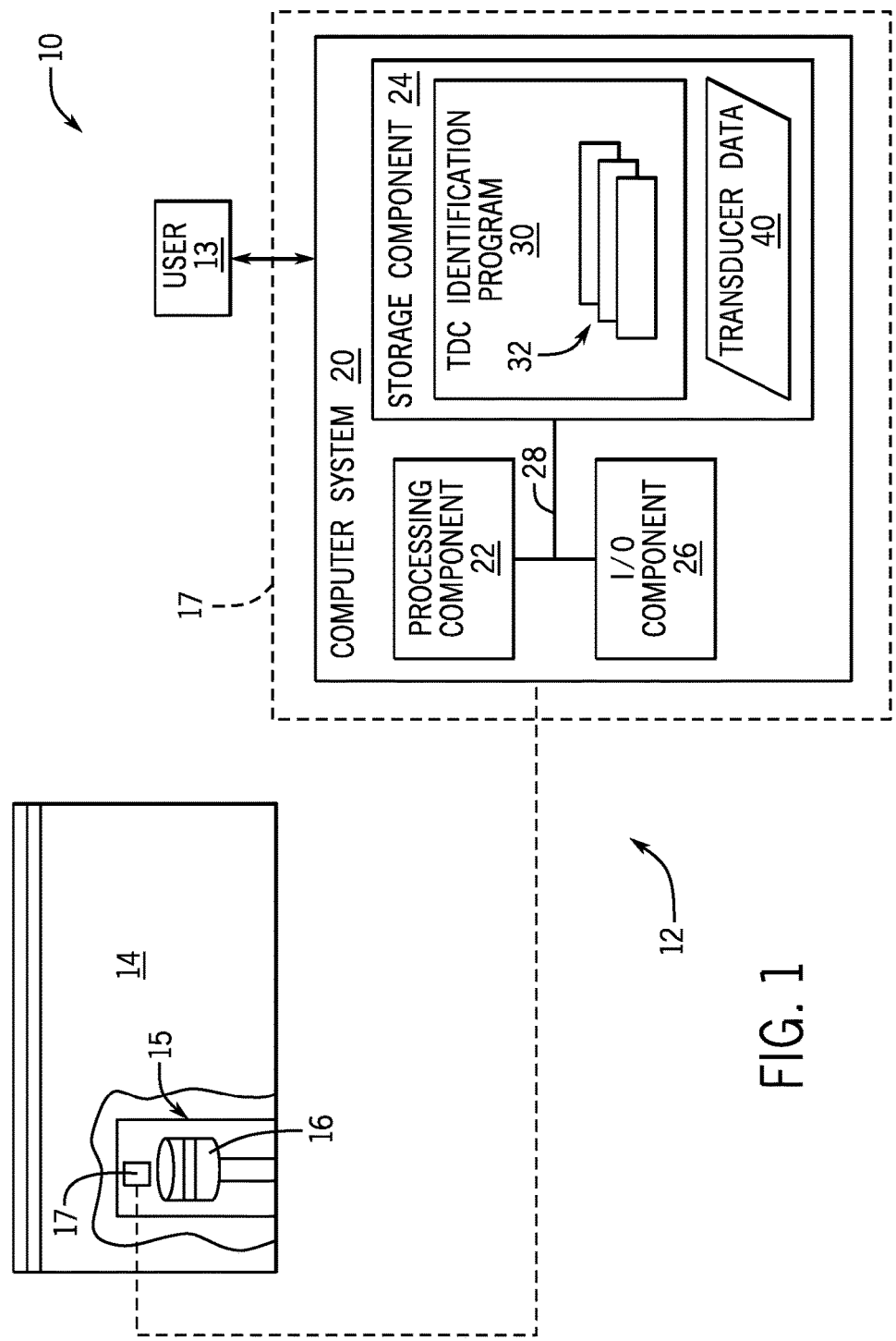
FIG. 1 shows a schematic depiction of an environment, including an apparatus, according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The present disclosure provides techniques for monitoring a compressor. For example, a compressor may include a piston that cycles between two positions within a cylinder to receive a fluid and to compress the fluid. The fluid may be air. The operation of the compressor may be tuned using data that indicates the time and position of the piston within the cylinder as the piston cycles between the two positions. As described more fully below, some embodiments of the disclosed subject matter relate to a compressor that is configured to use pressure data from the cylinder to determine the position of the piston within the cylinder as the piston cycles between the two positions. The pressure data may be processed to determine a top-dead-center position of the piston by an elimination process that removes unlikely position candidates from further consideration as the top-dead-center position. Other embodiments are within the scope of the disclosed subject matter.

As noted, the subject matter disclosed herein relates to compressor systems. More particularly, the subject matter relates to diagnostics of compressor systems.

As described herein, conventional diagnostic approaches for determining the top-dead-center (TDC) position on a reciprocating compressor require that the compressor be powered off (shutdown). With the compressor shut down, a dial indicator or level may be used to determine the TDC position. With the TDC established, a proximity probe may be installed to view an event on the crankshaft or crosshead. The structure(s) viewed by the proximity probe may be detectable on a once-per-turn or multiple-event-per-turn basis, or a combination thereof. After determining the TDC position and installing the proximity probe, the compressor maybe re-started. The conventional approach relies upon this proximity probe and an event (referred to as a phase-reference transducer) along with requisite wiring connecting the probe and the transducer, to mark TDC for each revolution. Modification of the compressor and/or crankshaft, installation of wiring, and verification of components add expense to the diagnostic system.

Additionally, in conventional approaches, the event data must be collected simultaneously across the pressure transducer and the phase-reference transducer so that the TDC marked by the phase-reference transducer can be accurately related to the pressure transducer. The need for this type of simultaneous data collection nearly excludes wireless transmission of data from the compressor as it can be difficult to ensure simultaneous transmission of data from various points, particularly in industrial environments.

As described herein, prior approaches for determining the TDC of a reciprocating engine include comparing measured event data to a thermodynamic model or comparing measured event data to a model pressure curve ratio. In both cases, the models include pre-supposed information about the engine, and building those models requires additional time and resources, e.g., for development and tuning.

As described herein, the terms "phase-reference transducer" or "PRT" can be used to refer to a probe which detects a shaft reference point on a moving shaft and provides data about that shaft reference point, e.g., to a computing device. One commonly used phase-reference transducer is known commercially as a Keyphasor™, which is a registered trademark of the Bently Nevada Corporation, PO Box 157, Minden, Nev. 89423.

Various embodiments of the invention include approaches for determining a TDC of a reciprocating compressor without the use of a phase-reference transducer, which allows for, among other things, wireless sampling and analysis of data about the reciprocating compressor. Some embodiments include an apparatus having a pressure transducer (also referred to as a pressure probe) coupled with at least one computing device. The pressure transducer can continuously sample asynchronous waveform data about the reciprocating compressor's shaft. As used herein, the term "asynchronous waveform" or "asynchronous waveform data" is defined as an array of numbers, equally spaced in time, that represent pressure fluctuations inside the cylinder of a compressor (e.g., about the movement of the compressor shaft within the cylinder). The computing device(s) can extract a single revolution of data from that asynchronous waveform data, manipulate or process that extracted data, and determine a portion of the waveform data that corresponds with the TDC position of the compressor. Various embodiments of the invention are described with reference to manipulating or processing asynchronous waveform data that represents the pressure in the cylinder at piston angles of the compressor's piston. As used herein, the term "piston angle" refers to the number of degrees of crank rotation from the first sample in the waveform (asynchronous waveform) to the sample taken at TDC. For example, where the waveform data corresponding to one revolution (e.g., cycle) of the piston has 100 sample values with a uniform sample rate, the first sample may be identified with a piston angle of "0," and the last sample may be identified with a piston angle of "99." The piston angle at the TDC position may be determined to be between the first may be determined to be between the first sample "0" and the last sample "99" of the cycle. That is, the piston angle is an index of the sample values of the waveform data, and the piston angle corresponds to a position of the piston during the revolution (e.g., cycle) of the piston within the cylinder.

Additional embodiments of the invention include a computer program product having program code, which when executed on at least one computing device, causes the at least one computing device to identify a top-dead-center (TDC) position of a piston within a compressor cylinder by performing actions including: obtaining an asynchronous waveform indicating pressure fluctuations inside a compressor cylinder; extracting a revolution data set representing piston angles over a single revolution of a piston within the compressor cylinder from the asynchronous waveform of the pressure fluctuations; removing or marking data representing invalid piston angles from the revolution data set to form a refined data set of the pressure fluctuations; determining an average piston angle (e.g., index) for the single revolution from the refined data set; and adjusting the refined data set to identify the top-dead-center (TDC) position of the piston within the compressor cylinder. As discussed in detail below, adjusting the refined data set to identify the TDC position may include shifting the index values (e.g., piston angle) of the refined data set so that the TDC position is at a desired index position (e.g., first index value, last index value). Additionally, or in the alternative, the revolution data set index values (e.g., piston angles) of the revolution data set may be shifted so that the TDC position is at a desired index position.

Other embodiments of the invention include a computer-implemented method that includes performing processes using at least one computing device. The processes can include: obtaining an asynchronous waveform indicating pressure fluctuations inside a compressor cylinder; extracting a revolution data set representing piston angles over a single revolution of a piston within the compressor cylinder from the asynchronous waveform of the pressure fluctuations; removing data representing invalid piston angles from the revolution data set to form a refined data set of the pressure fluctuations; determining an average piston angle (e.g., index) for the single revolution from the refined data set; and adjusting the refined data set to identify a top-dead-center (TDC) position of the piston within the compressor cylinder.

Turning to the drawings, FIG. 1 shows an illustrative environment 10 including an apparatus 12 and a (reciprocal motion) compressor 14 according to various embodiments of the invention. Environment 10 further includes at least one computing device (computer system 20), which includes a top-dead-center (TDC) identification program 30, which makes computer system 20 operable to determine a TDC of one or more pistons within the compressor by performing a process described herein.

A portion of the compressor 14 is shown in a cut-away view to illustrate one compressor cylinder 15 housing a piston 16. Also shown, along a sidewall of the cylinder 15, is a pressure transducer 17, which can be mounted in a conventional manner along the cylinder 15. The pressure transducer 17 can include any conventional pressure transducer, e.g., a piezoelectric pressure transducer, capacitive pressure transducer, optical pressure transducer, resonant pressure transducer, thermal pressure transducer, etc.

The pressure transducer 17 can be operably connected (or, "coupled") with the computer system 20, e.g., via wireless and/or hard-wired means (connection shown via dashed line). In various particular embodiments, the pressure transducer 17 and the computer system 20 are connected via a hard-wired connection, at least until the computer system 20 extracts at least one revolution of data to determine a TDC position of the piston 16 (described further herein). In other particular embodiments, the pressure transducer 17 includes at least one component of the computer system 20, such that one or more processes performed by the computer system 20 can be performed at the pressure transducer 17 (or in the computer system 20 physically coupled to the transducer 17). FIG. 1 shows this embodiment in phantom, where at least one component of the computer system 20 is contained within the pressure transducer 17. Various embodiments of the invention are directed toward the apparatus 12, which includes the computer system 20 coupled with the pressure transducer 17. Various other embodiments are directed toward the computer system 20, which can obtain data, e.g., from the pressure transducer 17, and perform processes using that data to determine a top-dead-center (TDC) position of the piston 16 within the compressor cylinder 15. Various other embodiments include methods and computer program products which can include functions performed by a computing device, e.g., computer system 20.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as TDC identification program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 13 to interact with computer system 20 and/or one or more communications devices to enable a system user 13 to communicate with computer system 20 using any type of communications link. To this extent, TDC identification program 30 can manage a set of interfaces (e.g., graphical user interface(s), application program interface, and/or the like) that enable human and/or system users 13 to interact with TDC identification program 30. Further, TDC identification program 30 can manage (e.g., store, retrieve, create, manipulate, organize, present, etc.) the data, such as transducer data 40, using any solution. As described herein, transducer data 40 can include data gathered and/or transformed by a pressure transducer (e.g., transducer 17). In some cases, that transducer data 40 can indicate pressure fluctuations inside a compressor cylinder (e.g., cylinder 15), and in some cases, the transducer data 40 can include an asynchronous waveform transformation of pressure fluctuation data. The asynchronous waveform can include a series of uniformly spaced data points, which indicate pressure fluctuation data obtained continuously from the cylinder 15.

In any event, computer system 20 can comprise one or more general purpose computing articles of manufacture (e.g., computing devices) capable of executing program code, such as TDC identification program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, TDC identification program 30 can be embodied as any combination of system software and/or application software.

Further TDC identification program 30 can be implemented using a set of modules 32. In this case, a module 32 can enable computer system 20 to perform a set of tasks used by TDC identification program 30, and can be separately developed and/or implemented apart from other portions of TDC identification program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of TDC identification program 30 fixed thereon (e.g., one or more modules 32). However, it is understood that computer system 20 and TDC identification program 30 are only representative of various possible equivalent computer systems that may perform a process described herein. To this extent, in other embodiments, the functionality provided by computer system 20 and TDC identification program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

Figure 2:
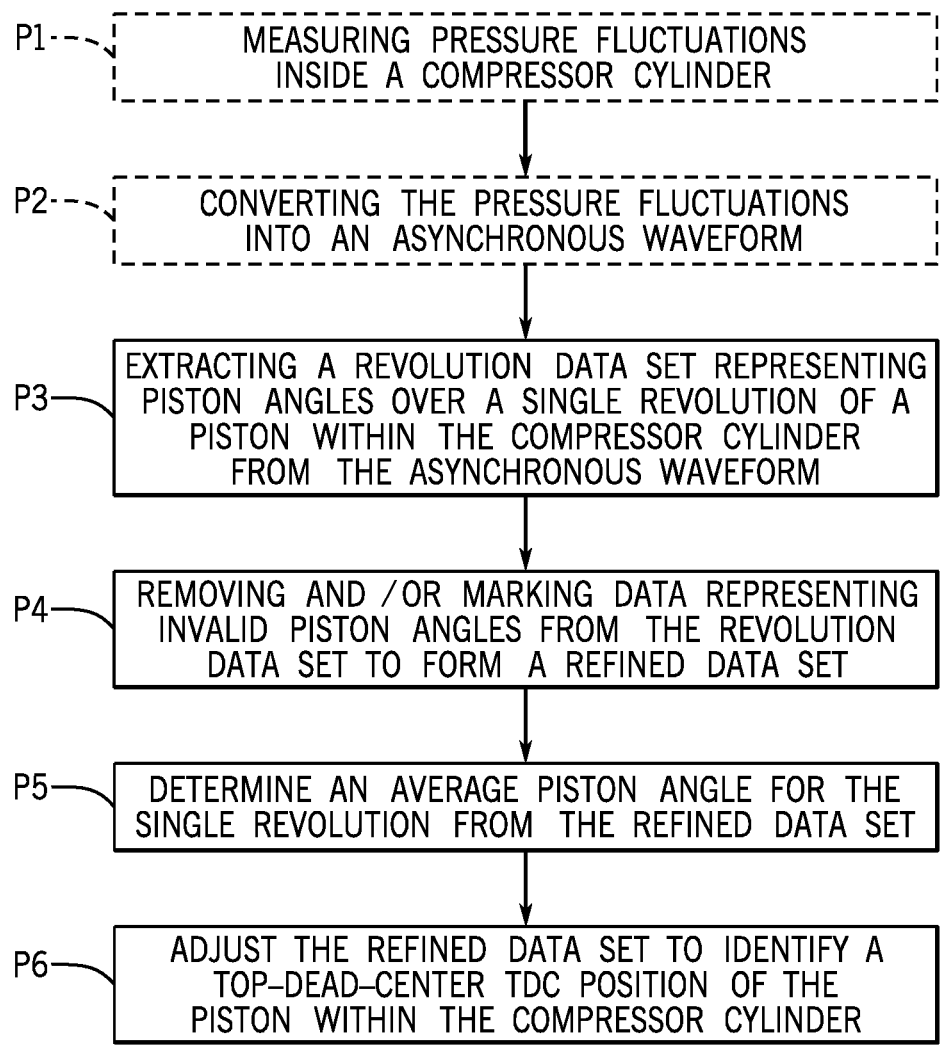
FIG. 2 is a flow diagram depicting a process according to various embodiments of the invention.

FIG. 2 illustrates a flow chart depicting general processes which can be performed according to various embodiments of the invention. In some cases, these processes are described with reference to the environment 10 of FIG. 1, however, it is understood that various processes can be performed in accordance with other environments and components not specifically depicted. These processes can be performed in the order shown, or in any other order to perform the functions of the invention described herein. Certain processes are illustrated as not necessarily being included in all embodiments by dashed lines. For example, preliminary processes P1 and P2 can be performed according to various embodiments described herein (e.g., those embodiments employing a pressure transducer 17 to gather pressure fluctuation data and convert that data to an asynchronous waveform). However, in various embodiments, an asynchronous waveforms is obtained, e.g., by at least one computing device, without requiring the measurement and conversion processes in P1-P2. As shown, various methods can include:

Process P1: Measuring pressure fluctuations inside a compressor cylinder (e.g., pressure cylinder 15). In various embodiments, the pressure transducer is configured to measure pressure fluctuations within the compressor cylinder using conventional methods, e.g., piezoelectric, optical, etc.

Process P2: After measuring pressure fluctuations within the pressure cylinder 15, the pressure transducer 17 can convert that fluctuation data into an asynchronous waveform, e.g., a continuous data set having evenly spaced data points representing pressure within the cylinder 15 over time. Additionally, or in the alternative, the computer system 20 may sample the pressure fluctuations sensed by the pressure transducer 17, and convert the fluctuation data into the asynchronous waveform. The computer system 20 and/or the pressure transducer 17 may sample the pressure transducer at a rate between approximately 60 to 20,000 Hz, 100 to 10,000 Hz, 300 to 5,000 Hz, or any rate therein. As described herein, the asynchronous waveform can be analyzed by other elements of the apparatus 12, e.g., the computer system 20, for the purposes of identifying a top-dead-center (TDC) position of the piston 16 within the cylinder 15. In various embodiments, the pressure transducer 17 can transmit the asynchronous waveform data (and in some cases, the raw pressure data) to the computer system 20 as transducer data 40. It is understood that in alternative embodiments, the pressure transducer 17 could store the transducer data 40 (asynchronous waveform data), e.g., in an internal data store, external data store, or other location for later access by the computer system 20.

Process P3: At the computer system 20, the TDC identification program 30 can obtain the transducer data 40 (including asynchronous waveform data, and in some cases, the raw pressure data), which was previously obtained by the pressure transducer 17. As noted herein, in some cases, the TDC identification program 30 can obtain the transducer data 40 from a data store, or directly from the pressure transducer 17 (via wireless and/or hard-wired means). The TDC identification program 30 can then extract a revolution data set representing piston angles (angles of piston 16 within cylinder 15) over a single revolution of the piston 16 within the compressor cylinder 15 from the transducer data 40 (asynchronous waveform data). The process of extracting this single revolution of data is further described with reference to the flow diagram of FIG. 3. Each data point of the revolution data set corresponds to a piston angle (e.g., index) that may be utilized to identify the respective data point within the revolution data set for subsequent processes.

Process P4: After extracting the revolution data set representing a single revolution of the piston 16 within cylinder 15, the TDC identification program 30 can remove data representing invalid piston angles from the revolution data set to form a refined data set with the remaining piston angles that have not been determined as invalid piston angles. In some embodiments, the TDC identification program 30 identifies, tags, or marks piston angles (e.g., index values) of the revolution data set as invalid piston angles rather than removing the invalid piston angles from the revolution data set. Additionally, or in the alternative, the TDC identification program 30 identifies, tags, or marks piston angles of the revolution data set as valid piston angles and extracts those from the revolution data set to form a refined data set. As discussed below, the term "invalid piston angle" refers to a piston angle (e.g., index) of the revolution data set that the TDC identification program 30 determines could not correspond to the true TDC position of the piston within the cylinder. As discussed in detail below, the TDC identification program 30 may determine whether a piston angle (e.g., index) is an invalid piston angle by evaluating one or more properties (e.g., compression ratio, volumetric efficiency, clearance volume) of the compressor as though the respective piston angle (e.g., index) is the true piston angle corresponding to the TDC position of the piston, and comparing the evaluated one or more properties to respective ranges of the one or more properties known or otherwise determined to correspond to the TDC position of the piston. For example, the TDC identification program 30 may determine the piston angle (i.e., BDC piston angle) corresponding to the true bottom dead center (BDC) position of the piston within the cylinder to be an invalid piston angle of the revolution data set because properties (e.g., compression ratio) evaluated as though the BDC piston angle was the true piston angle corresponding to the TDC position of the piston yields results outside of prescribed ranges of the properties. In other words, the TDC identification program 30 may identify a piston angle as an invalid piston angle if the respective piston angle does not lead to evaluated properties determined to be consistent with the true piston angle that corresponds to the TDC position of the piston.

Figure 4:
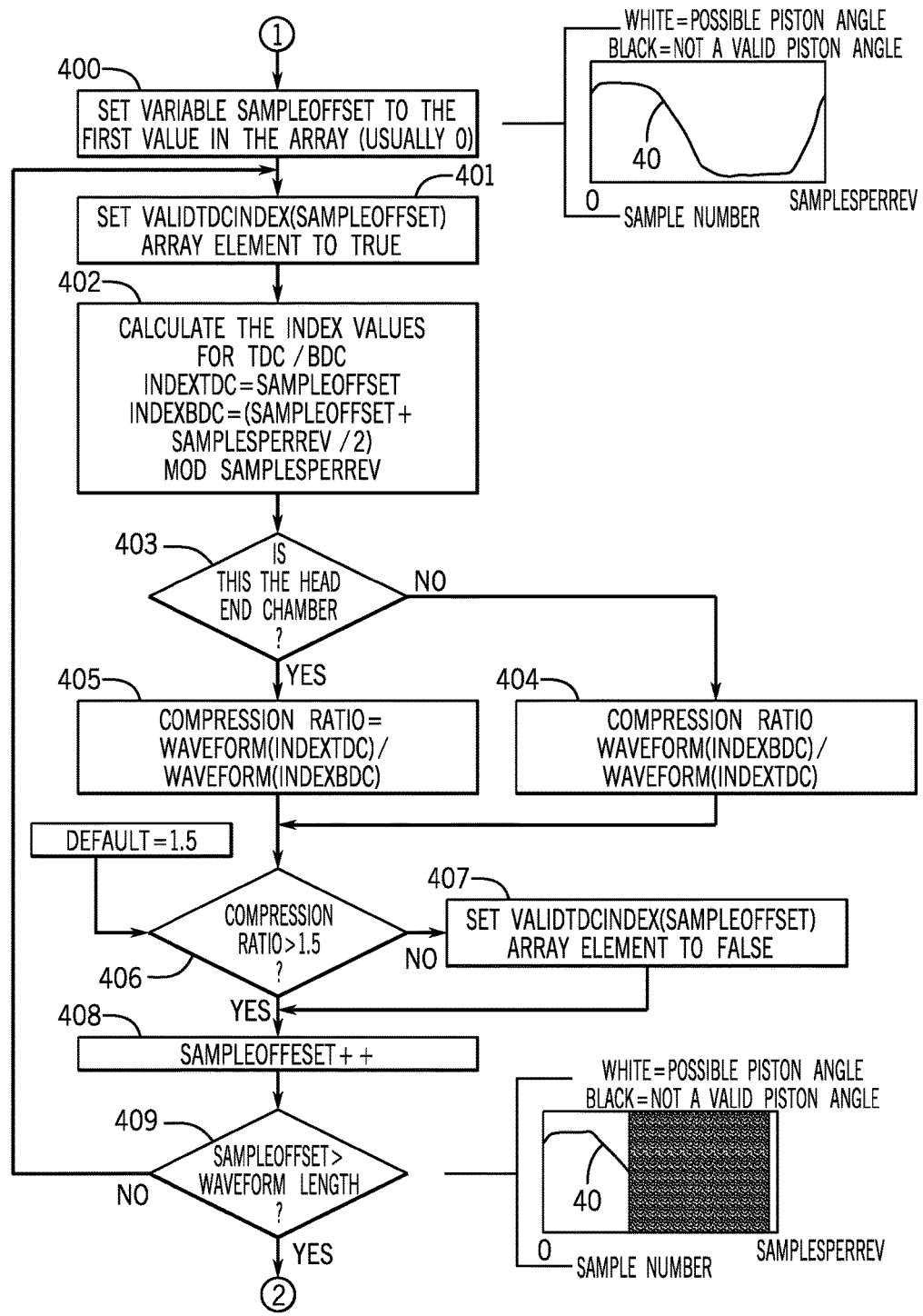
FIG. 4 is a flow diagram depicting a sub-process from FIG. 2, according to various embodiments of the invention.
Figure 8:
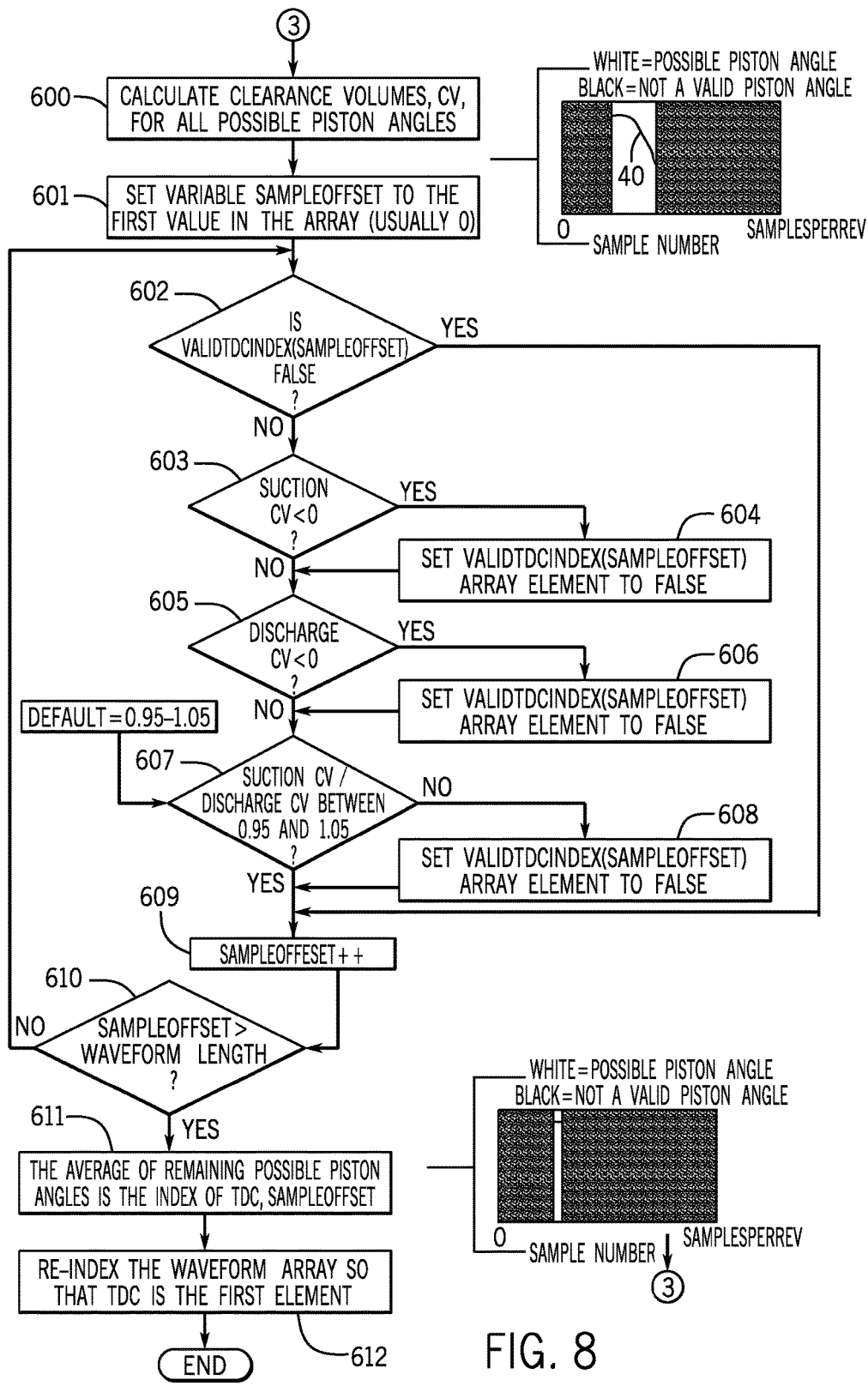
FIG. 8 is a flow diagram depicting a sub-process from FIG. 2, according to various embodiments of the invention.

Removing and/or marking invalid piston angle data can be performed according to various approaches, which may be combined or used separately to remove data that may inhibit analysis of the asynchronous waveform. Three approaches are shown and described in detail according to various embodiments of the invention. These three approaches are described with greater detail referring to FIGS. 4, 5 and 8, respectively. The approaches include:

A) Identifying and excluding piston angles (e.g., indices) based upon an evaluation of a compression ratio for the piston angles of the single revolution of the piston 16 within the compressor cylinder 15 (FIG. 4);

B) Identifying and excluding piston angles (e.g., indices) based upon an evaluation of one or more volumetric efficiency properties for the piston angles of the single revolution of the piston 16 within the compressor cylinder 15 (FIG. 5); and/or C) Identifying and excluding piston angles (e.g., indices) based upon an evaluation of one or more clearance volume properties for the piston angles of the single revolution of the piston 16 within the compressor cylinder 15 (FIG. 8).

Process P5: After removing or marking data representing invalid piston angles (e.g., indices) to form the refined data set, the TDC identification program 30 can take the refined data set and determine an average piston angle (e.g., index) over the single revolution, e.g., via conventional averaging techniques known in the art. For example, if the revolution data set has pressure fluctuation data corresponding to 1000 piston angles (e.g., indices), the refined data set may exclude 951 of the piston angles as invalid piston angles, such as piston angles (e.g., indices) 0-650 and 700-999, thereby identifying piston angles (e.g., indices) 651-699 as potentially valid piston angles. The TDC identification program 30 may determine the average piston angle of the refined data set to be piston angle 675 (i.e., (651+699)/2=675). That is, the average piston angle is an index position within the revolution data set.

Process P6: After averaging the refined data set, the TDC identification program 30 adjusts the refined data set and/or the revolution data set to identify a top-dead-center (TDC) position of the piston 16 within the compressor cylinder 15. In various embodiments, this includes shifting the refined data set by the averaged value (e.g., averaged index, averaged piston angle) so that the TDC value is the first value in the refined data set. In some embodiments, this includes shifting the revolution data set by the averaged value so that the TDC value is the first value in the revolution data set. For example, where the average piston angle corresponding to the identified TDC position is piston angle 675 out of 1000 total piston angles of the revolution data set as discussed above, the revolution data set may be adjusted by re-indexing the data points so that piston angle 0 corresponds to the identified TDC position. Table 1 below illustrates this example of adjusting the indices of the data points from the sampled piston angle of the initial revolution data set to the adjusted piston angle of the adjusted (e.g., re-indexed) revolution data set.

TABLE 1

Adjusting piston angles.

| Sampled Piston Angle | Adjusted Piston Angle |
|---|---|
| 0 | 325 |
| 1 | 326 |
| 2 | 327 |
| 3 | 328 |
| ... | ... |
| 674 | 999 |
| 675 | 0 |
| 676 | 1 |
| ... | ... |
| 997 | 322 |
| 998 | 323 |
| 999 | 324 |

This process P6 can include graphically displacing (shifting) the refined data set along the time domain such that the first value in the refined data set matches the determined TDC value.

Figure 3:
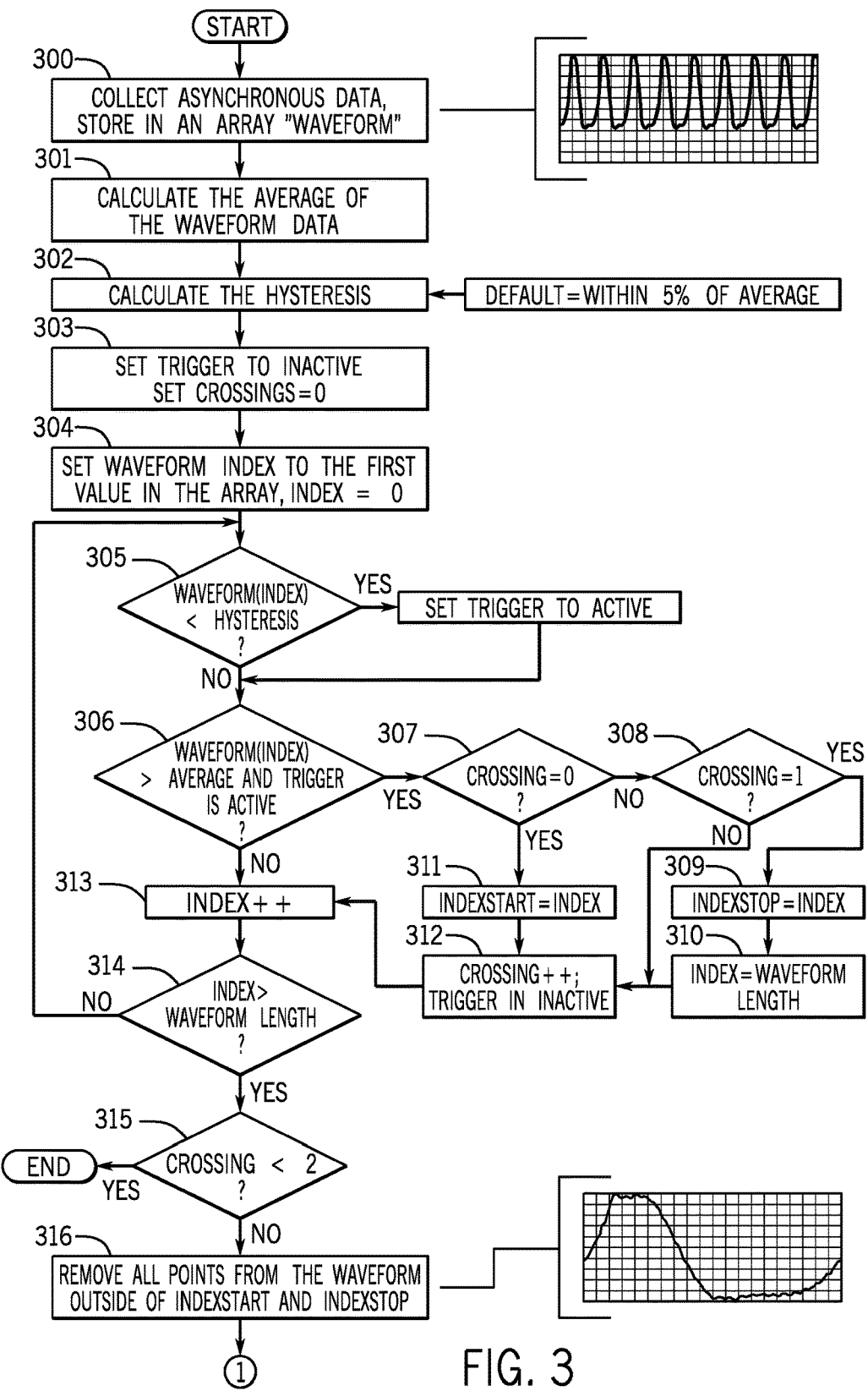
FIG. 3 is a flow diagram depicting a sub-process from FIG. 2, according to various embodiments of the invention.

FIG. 3 depicts an example flow diagram including processes in extracting a single revolution of data (e.g., revolution data set) from the asynchronous waveform according to some embodiments, as described with reference to Process P3 in FIG. 2. As shown, this process can include:

Process P300: Collect asynchronous data and store that data in an array (also referred to as a waveform). The graphical depiction adjacent process 300 illustrates a sample asynchronous waveform corresponding to pressure data over approximately 8 revolutions (e.g., cycles) of the piston 16 within the cylinder 15. Other sample asynchronous waveforms may correspond to pressure data over 1 or more revolutions of the piston 16 within the cylinder 15. As discussed above, the pressure fluctuation data of the asynchronous waveform may be uniformly spaced along the time domain.

Process P301: Calculate the average of the waveform data, e.g., via conventional averaging techniques. That is, Process P301 calculates the average of the pressure fluctuation data of the sample asynchronous waveform.

Process P302: Calculate the hysteresis of the waveform data, e.g., using a default value such as within 5% of the average (average determined in Process P301).

Process P303: Set a trigger to inactive, and set crossings equal to zero (0).

Process P304: Set a waveform index to the first value in the array, with the index equal to zero (0).

Decision D305: Is the waveform index less than the hysteresis value? If Yes, set trigger to active and proceed to Decision D306; if No, proceed directly to Decision D306.

Decision D306: Is the waveform index greater than the average of the waveform data AND is the trigger active?

If Yes, proceed to Decision D307.

Decision D307: Is the number of crossings equal to zero (0)?

If No, proceed to Decision D308.

Decision D308: Is the number of crossings equal to one (1)?

If Yes, in Process P309, set indexStop equal to the index, and in Process P310, set the index equal to waveform length.

Returning to Decision D307, if the number of crossings is equal to zero (0)

If Yes, process P311 includes setting indexStart equal to the index.

Process P312 includes increasing the crossing values (crossings++), and setting the trigger to inactive.

Returning to Decision D308, if the number of crossings is not equal to one (1) (No), the process flows to Process P312 because one full revolution of pressure data has not yet been processed. Similarly, following process P310 (index=waveform length), the method proceeds to Process P312.

Returning to Decision D306, if No, Process P313 includes: increase the index (index++). This Process P313 also follows Process P312.

After process P313; proceed to Decision D314: Is the index greater than the waveform length?

If No, return to Decision D305.

If Yes, proceed to Decision D315: Is the number of crossings less than two (2)?

If Yes, End.

If No, proceed to Process P316: Remove all points from the waveform outside of indexStart and indexStop, thereby reducing the asynchronous waveform data set to the revolution data set corresponding to the pressure fluctuations of one revolution (e.g., cycle) of the piston. The Process P3 utilizes crossings of the pressure fluctuation waveform relative to the average of the sample asynchronous waveform to extract the revolution data set. The graphical depiction adjacent Process P316 in FIG. 3 illustrates a snapshot of a single revolution of data about a piston within a compressor cylinder. As discussed herein, the graphical depiction adjacent Process P316 in FIG. 3 may be referred to as the extracted data set or the revolution data set.

It is understood that the process flows of FIGS. 3-5 and 8 can be performed successively, simultaneously, or completely independently according to various embodiments of the invention. Linkage between these process flows (as illustrated by connecting nodes (1), (2) (3)) is shown merely for illustrative purposes.

FIG. 4 depicts an example flow diagram including processes in identifying and excluding piston angles based upon a compression ratio of the single revolution of the piston 16 within the compressor cylinder 15, according to some embodiments, as described with reference to Process 4 in FIG. 2. As shown, this process can include:

Process P400: Set variable SampleOffset to the first value in the array (waveform). Process P400 is illustrated with a graphical depiction showing samples (e.g., indices, piston angles) per revolution, where the color white indicates a possibly valid piston angle, and black indicates an invalid piston angle. As shown in the graphical depiction adjacent Process P400 of FIG. 4, prior to performing the process of FIG. 4 (and the processes of FIGS. 5 and 8), each of the samples (e.g., indices, piston angles) may be considered to be a possibly valid piston angle. The first piston angle (e.g., index) of the array (e.g., waveform) is shown at the left with piston angle "0," and the last piston angle (e.g., index) of the array is shown at the right with piston angle "SamplesPerRev." The graphical depiction also shows the transducer data 40 corresponding to each piston angle. Processes P401 through Decision D409 determine a compression ratio of the compressor cylinder for each piston angle as though the respective piston angle corresponded to the true TDC position of the piston within the cylinder. That is, each iteration evaluates a compression ratio (Processes P404 and P405) for a piston angle, and determines whether the respective piston angle is an invalid piston angle.

Process P401: Set Valid TDC Index (Sample Offset) array elements to true.

Process P402: Calculate index values (e.g., piston angles) for top-dead-center (TDC) and bottom-dead-center (BDC); set indexTDC=SampleOffset; set indexBDC=(SampleOffset+SamplesPerRev/2)×MOD SamplesPerRev. For example, where the revolution data set has 1000 piston angles, the first iteration will set the indexTDC to piston angle 0, and the indexBDC to 500. The second iteration will set the indexTDC to piston angle 1, and the indexBDC to 501.

Decision D403: Is this data describing the head end of the compressor cylinder?

If No, Process P404: set Compression Ratio=Waveform (index BDC)/Waveform (index TDC). This evaluates a Compression Ratio using the pressure fluctuation data corresponding to the indexBDC and the indexTDC;

If Yes, Process P405: set Compression Ratio=Waveform (indexTDC)/Waveform (indexBDC). This evaluates a Compression Ratio using the pressure fluctuation data corresponding to the indexBDC and the indexTDC.

In either Yes or No to Decision D403, the process proceeds to Decision D406: Is the Compression ratio greater than a default value (e.g., 1.5 in some cases)?

If No, in process P407: set ValidTDCIndex (Sample Offset) array element to false. That is, if the Compression Ratio evaluated for a piston angle as though it corresponds to the TDC position of the piston is less than the default value, then the piston angle (e.g., index) may be determined to be an invalid piston angle.

If Yes, in process P408, increase the SampleOffSet (SampleOffSet++).

Decision D409: Is the SampleOffset greater than the waveform length?

Figure 5:
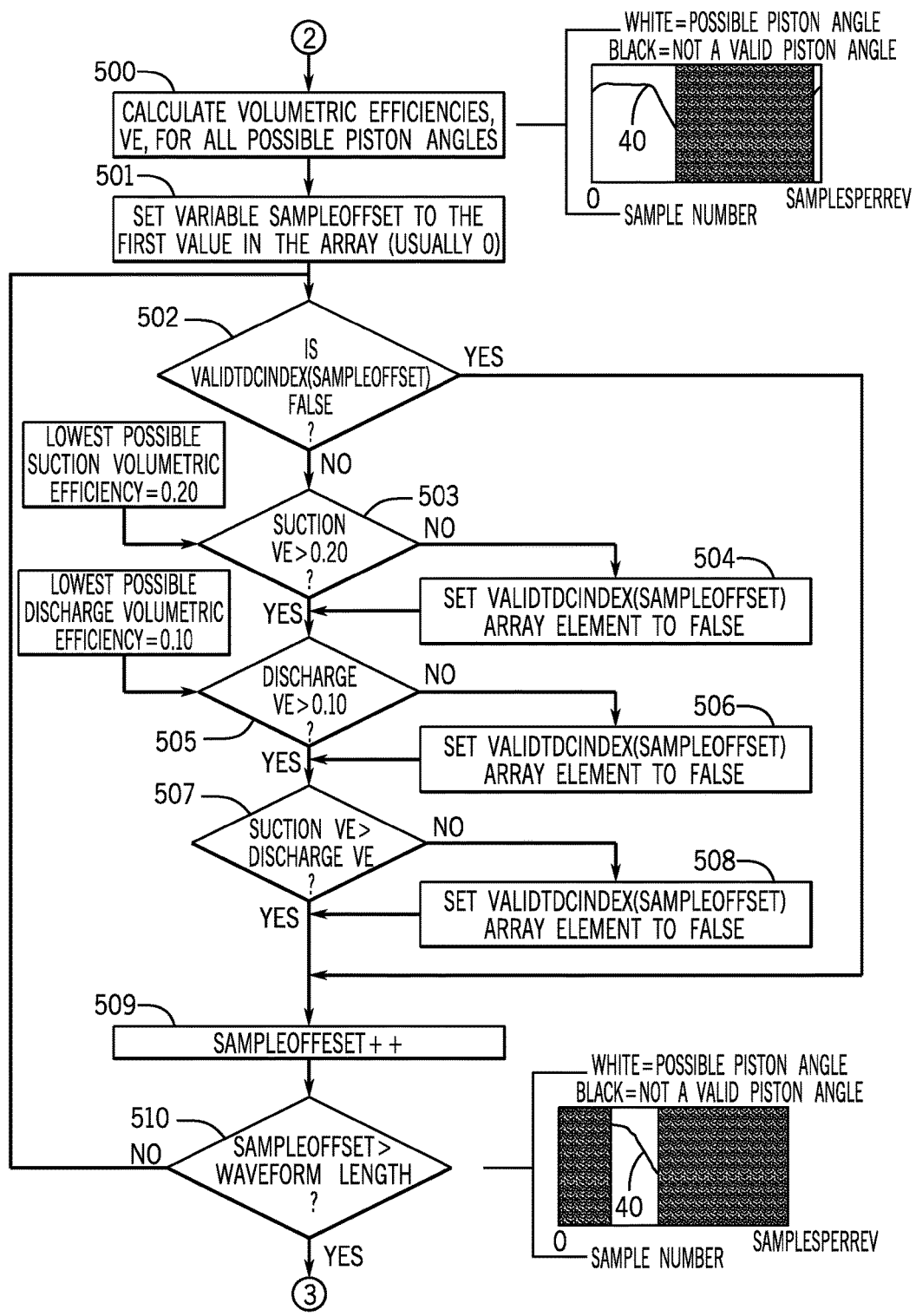
FIG. 5 is a flow diagram depicting a sub-process from FIG. 2, according to various embodiments of the invention.

If No, return to Process P401;

If Yes, in some embodiments, the process can proceed to identifying and excluding piston angles from further consideration as the TDC position based upon a volumetric efficiency of the single revolution of the piston within the compressor cylinder (FIG. 5). As shown adjacent node (2) in FIGS. 4 and 5, a portion of the sample data indicated in black in the graphical depiction was found invalid according to the processes illustrated in FIG. 4.

FIG. 5 depicts an example flow diagram including processes in identifying and excluding piston angles based upon a volumetric efficiency of the single revolution of the piston 16 within the compressor cylinder 15, according to some embodiments, as described with reference to Process 4 in FIG. 2.

Figure 6:
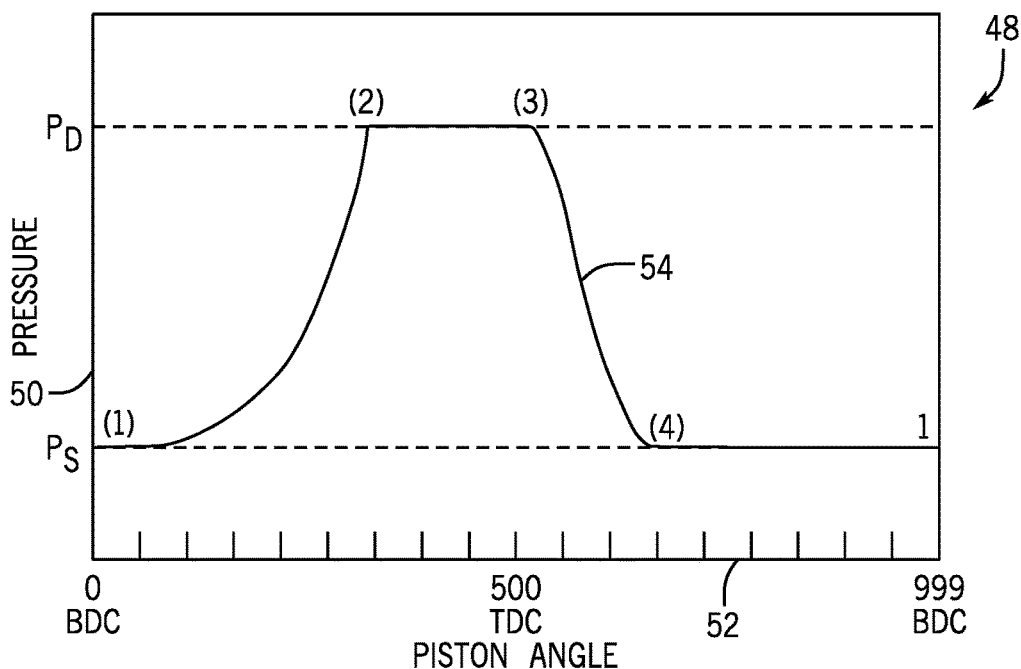
FIG. 6 is a diagram of an embodiment of a compression cycle within a cylinder of a compressor with respect to a piston angle of a piston within the cylinder.

The volumetric efficiency of the single revolution of the piston 16 within the compressor cylinder 15 may be evaluated based at least in part on the pressure fluctuation data during the single revolution. FIG. 6 depicts an idealized compression cycle 48 of the pressure 50 within the cylinder 15 with respect to piston angle 52 during a revolution (e.g., cycle) of the piston 16. The waveform 54 illustrates the pressure 50 corresponding to each piston angle 52 of the revolution data set. While the illustrated compression cycle 48 of FIG. 6 shows 1000 piston angles 52 (e.g., 0 to 999) of the waveform 54, it may be appreciated that some embodiments may have greater or fewer piston angles per revolution data set. When the piston 16 is at the true BDC position, as shown by reference (1), the pressure 50 may be at or near the suction pressure ($P_S$). As the piston 16 moves from the BDC position (1) toward the TDC position within the cylinder 15, as shown by reference (3), the pressure 50 may increase to the discharge pressure ($P_D$). The BDC position of the piston 16 within the cylinder 15 is opposite the TDC position, corresponding to the piston angle offset between the BDC position and the TDC position of half the quantity of the piston angles in the revolution data set. Reference (2) indicates the piston angle corresponding to when the discharge valve of the cylinder 15 opens to permit the release of the compressed fluid. After the piston 16 is at the TDC position (3), the piston 16 moves toward the BDC position (1), thereby decreasing the pressure to the suction pressure $P_S$ within the cylinder 15 as the volume expands. Reference (4) indicates the piston angle corresponding to when the suction valve of the cylinder 15 opens to permit the intake of the fluid to be compressed between points (1) and (3) of the next cycle. While the idealized compression cycle 48 illustrates references (2) and (3), and the points therebetween at the same discharge pressure $P_D$, sampled pressure fluctuations may vary at pressures approximate (e.g., within 5% or less) of the discharge pressure $P_D$. Additionally, while the idealized compression cycle 48 illustrates references (1) and (4), and the points therebetween at the same suction pressure $P_S$, sampled pressure fluctuations may vary at pressures approximate (e.g., within 5% or less) of the suction pressure $P_S$.

Figure 7:
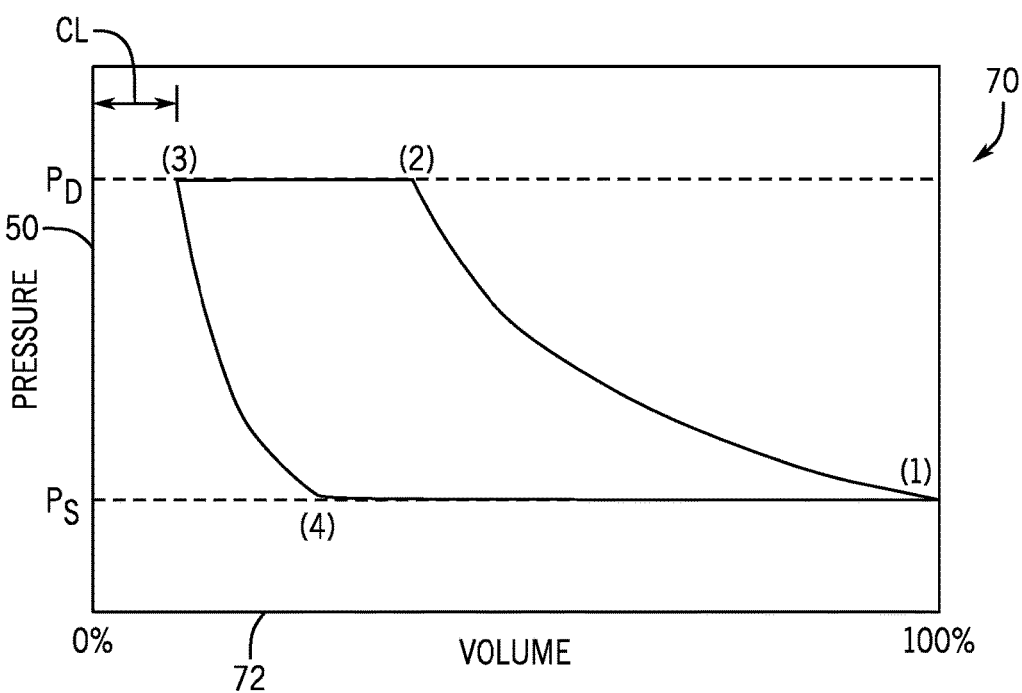
FIG. 7 is a pressure-volume diagram of an embodiment of a compression cycle within the cylinder of the compressor.

FIG. 7 depicts an idealized pressure-volume diagram 70 of the pressure 50 within the cylinder 15 with respect to volume 72 of the cylinder 15 during a revolution (e.g., cycle) of the piston 16. When the piston is at the true BDC position, as shown by reference (1), the pressure 50 may be at or near the suction pressure ($P_S$) and the volume is at a maximum value. As the piston 16 moves from the BDC position (1) toward the TDC position, as shown by reference (3). The volume decreases and the pressure increases from (1) to (2), then the discharge valve opens to enable the release of the compressed fluid at the discharge pressure $P_D$ as the volume decreases to the minimum value at TDC position (3). After the piston 16 is at the TDC position (3), the piston 16 moves toward the BDC position (1), thereby decreasing the pressure to the suction pressure $P_S$ within the cylinder 15 as the volume expands. Reference (4) indicates the pressure at which the suction valve of the cylinder 15 opens to permit the intake of the fluid to be compressed between points (1) and (3) of the next cycle. The volume of the cylinder 15 when the piston 16 is at the TDC position (3) is the clearance volume (CL).

Some measures of the volumetric efficiency of a compressor cylinder include, but are not limited to the suction volumetric efficiency (e.g., suction VE, VEs) and the discharge volumetric efficiency (e.g., discharge VE, $VE_D$). Using the positions (1), (2), (3), and (4) identified above in FIGS. 6 and 7, the suction VE and discharge VE may be defined as follows:

$$\text{Suction } VE = (V_1 - V_4)/(V_1 - V_3) \quad \text{(Equation 1)}$$

$$\text{Discharge } VE = (V_2 - V_3)/(V_1 - V_3) \quad \text{(Equation 2)}$$

Additionally, the suction VE may be defined in terms of the clearance volume CL, the discharge pressure $P_D$, the suction pressure $P_S$, and the isentropic volume exponent k, as shown in Equation 3 below.

$$VE_S = 1 - CL[(P_D/P_S)^{(1/k)} - 1] \quad \text{(Equation 3)}$$

Furthermore, the discharge VE may be defined from the suction VE as shown here in Equation 4:

$$VE_D = (VE_S)[(P_D/P_S)^{(1/k)}] \quad \text{(Equation 4)}$$

Using the above equations, the discharge VE and the suction VE may be determined using the discharge pressure $P_D$ and the suction pressure $P_S$ without using the volume corresponding to each pressure. As noted above, the pressure within the cylinder 15 at the TDC is the discharge pressure $P_D$, and the pressure within the cylinder 15 at the BDC is the suction pressure $P_S$. Accordingly, values for the discharge VE and the suction VE may be evaluated for each piston angle of the revolution data set and/or each piston angle of the revolution data set that has yet to be determined as an invalid piston angle. For example, a first pressure data point (e.g., the pressure data point at the first piston angle 0: $P_{d0}$) is selected for evaluation as if the first pressure data point corresponds to the TDC position. This first pressure data point is evaluated as the pressure at $V_3$ according to Equations 1 and 2 above. A second pressure data point (e.g., the pressure data point at the middle piston angle 500: $P_{D500}$) is selected for evaluation as if the second pressure data point corresponds to the BDC position. The piston angle of the second pressure data point is offset from the piston angle of the first pressure data point by half the length of the revolution data set. This second pressure data point is evaluated as the pressure at $V_1$ according to Equations 1 and 2 above.

Continuing the above example, a third pressure data point of the revolution data set is determined for evaluation as the pressure at $V_4$. This third pressure data point is determined by locating the next pressure data point in the revolution data set after the second pressure data point (e.g., the possible BDC position) with a value greater than the first pressure data point. The suction VE may be determined based on Equation 1 above where the piston angles (e.g., indices) of the second, third, and first pressure data points are used respectively in lieu of volumes for $V_1$, $V_4$, and $V_3$ in Equation 1. A fourth pressure data point of the revolution data set is determined for evaluation as the pressure at $V_2$. This fourth pressure data point is determined by locating the next pressure data point in the revolution data set after the first pressure data point (e.g., the possible TDC position) with a value less than the second pressure data point. The discharge VE may be determined based on Equation 2 above where the piston angles (e.g., indices) of the fourth, first, and second pressure data points are used respectively in lieu of volumes for $V_2$, $V_3$, and $V_1$ in Equation 2.

Returning to the process shown in FIG. 5, the process of identifying and excluding piston angles based upon a volumetric efficiency, can include the following:

Process P500: Calculating a suction volumetric efficiency ($VE_S$) and discharge volumetric efficiency ($VE_D$) for all possible piston angles of the revolution data set.

Process P501, set variable SampleOffset to the first value in the array (waveform). The first value is usually zero (0).

Decision D502: Is ValidTDCIndex (SampleOffset) false?

If Yes, proceed to Process P509: increase sample offset (SampleOffset++), thereby skipping piston angles previously deemed to be invalid as the possible TDC piston angle;

If No, proceed to Decision D503: Is suction VE greater than a threshold (e.g., 0.20)? The suction VE threshold may be based on analyses of the suction VE evaluation of revolution data sets with a known TDC piston angle.

If No, proceed to Process P504: Set ValidTDCIndex (SampleOffset) array element to false, thereby evaluating the piston angle as an invalid piston angle;

If Yes (and if No, after Process P504), proceed to Decision D505: Is discharge VE greater than a threshold (e.g., 0.10)? The discharge VE threshold may be based on analyses of the discharge VE evaluation of revolution data sets with a known TDC piston angle.

If No, proceed to Process P506: Set ValidTDCIndex (SampleOffset) array element to false, thereby evaluating the piston angle as an invalid piston angle.

If Yes (and if No, after Process P506), proceed to Decision D507: Is suction VE greater than discharge VE? It may be appreciated that the discharge VE of a cylinder of a reciprocating compressor is less than the suction VE.

If No, proceed to Process P508: Set ValidTDCIndex (SampleOffset) array element to false, thereby evaluating the piston angle as an invalid piston angle.

If Yes (and if No, after Process P508), proceed to Process P509: increase sample offset (SampleOffset++).

Following Process P509, decision D510 includes: Is SampleOffset greater than waveform length?

If No, return to Decision D502;

If Yes, in some embodiments, the process can proceed to identifying and excluding piston angles based upon a clearance volume of the single revolution of the piston within the compressor cylinder (FIG. 8). As shown adjacent node (3), a portion of the sample data indicated in black in the graphical depiction was found invalid according to the processes illustrated in FIG. 5.

FIG. 8 depicts an example flow diagram including processes in identifying and excluding piston angles based upon a clearance volume of the single revolution of the piston 16 within the compressor cylinder 15, according to some embodiments, as described with reference to Process 4 in FIG. 2. As shown, this process can include:

Process P600: Calculate suction clearance volume ($CV_S$) and discharge clearance volume ($CV_D$) for all possible piston angles of the revolution data set.

The suction clearance volume (e.g., suction CV, $CV_S$) may be determined utilizing the suction VE from Equation 1 with Equation 3, solving for CL as the suction clearance volume $CV_S$. That is, the suction CV may be defined as follows:

$$\text{Suction } CV = (1 - VE_S)/[(P_D/P_S)^{(1/k)} - 1] \quad \text{(Equation 5)}$$

Additionally, the discharge clearance volume (e.g., discharge CV, $CV_D$) may be determined utilizing the discharge VE from Equation 2 with Equation 4 and the Suction VE of Equation 3 to solve for CL as the discharge clearance volume $CV_D$. That is, the discharge CV may be defined as follows:

$$\text{Discharge } CV = [1 - VE_D(P_D/P_S)^{(1/k)}]/[(P_D/P_S)^{(1/k)} - 1] \quad \text{(Equation 6)}$$

Accordingly, the calculated suction volumetric efficiency ($VE_S$) and discharge volumetric efficiency ($VE_S$) for all possible piston angles from Process P500 of FIG. 5 may be used to determine the clearance volumes.

Process P601: Set variable SampleOffset to the first value in the array (waveform), which is typically a value of zero (0). Process P601 is illustrated with a graphical depiction showing samples per revolution data set, where the color white indicates a possibly valid piston angle, and black indicates an invalid piston angle of the revolution data set.

Decision D602: Is ValidTDCIndex (SampleOffset) false?

If Yes, proceed to Process P609: Increase sample offset (SampleOffset++), thereby evaluating the piston angle as an invalid piston angle;

If No, proceed to Decision D603: Is the suction CV less than zero (0)? The suction CV threshold may be based on analyses of the suction CV evaluation of revolution data sets with a known TDC piston angle.

If Yes, proceed to Process P604: set ValidTDCIndex (SampleOffset) array element to false, thereby evaluating the piston angle as an invalid piston angle;

If No (and if Yes, after Process P604), proceed to Decision D605: Is the discharge CV less than zero (0)? The discharge CV threshold may be based on analyses of the discharge CV evaluation of revolution data sets with a known TDC piston angle.

If Yes, proceed to Process P606: Set ValidTDCIndex (SampleOffset) array element to false), thereby evaluating the piston angle as an invalid piston angle;

If No (and if Yes, after Process P606), proceed to Decision D607: Is (Suction CV/Discharge CV) between a threshold range (e.g., 0.95 and 1.05)?

If No, proceed to Process P608: Set ValidTDCIndex (SampleOffset) array element to false;

If Yes (and if No, after process P608), proceed to Process P609: Increase sample offset (SampleOffset++).

Following Process P609, Decision D610 asks: Is the SampleOffset greater than the waveform length?

If No, return to Decision D602;

As shown adjacent Decision D610, a portion of the sample data per revolution data set indicated in black was found invalid according to the processes illustrated in FIG. 8. That is, the larger black portions indicate piston angles determined to be invalid piston angles that do not correspond to the TDC position, and the white portion indicates piston angles determined to be valid candidates for the TDC position.

If Yes, Proceed to Process P611: Average the remaining possible piston angles (not indicated as invalid), and that average is determined to be the index of the TDC, SampleOffset.

Finally, Process P612: Re-index (adjust) the waveform array so that the piston angle determined to be the index of the TDC is the first element in the waveform and revolution data set.

It is understood that the various processes described herein, e.g., according to FIGS. 2-5 and 8, may be performed using the computer system 20, including the TDC identification program 30 (FIG. 1). The computer system 20 can obtain and manipulate transducer data 40 according to any of the embodiments described herein.

In any event, computer system 20 can obtain transducer data 40 using any solution. For example, computer system 20 can generate and/or be used to generate transducer data 40, retrieve transducer data 40 from one or more data stores, receive transducer data 40 from another system, and/or the like.

While shown and described herein as a method and system for providing a TDC identification program, it is understood that aspects of the invention further provide various alternative embodiments. For example, in one embodiment, the invention provides a computer program fixed in at least one computer-readable medium, which when executed, enables a computer system to determine a top-dead-center location in a reciprocating compressor. To this extent, the computer-readable medium includes program code, such as TDC identification program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as TDC identification program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating TDC identification program. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

In any case, the technical effect of the TDC identification program 30 shown and described herein is to identify a top-dead-center position of a piston within a cylinder of a reciprocating compressor based at least in part on pressure fluctuation data, such as from the pressure transducer 17 of the cylinder 15 of the compressor.

The foregoing description of various aspects of the invention has been presented for purposes of illustration and description. It is not intended to be exhaustive or to limit the invention to the precise form disclosed, and many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus comprising:
a pressure transducer configured to measure a pressure inside a compressor cylinder and convert the measured pressure into an asynchronous waveform; and
at least one computing device operably connected with the pressure transducer, the at least one computing device configured to:
extract a revolution data set representing piston angles over a single revolution of a piston within the compressor cylinder from the asynchronous waveform;
evaluate a property corresponding to the measured pressure at each piston angle of the revolution data set;
determine whether each piston angle of the revolution data set is an invalid piston angle that does not correspond to a top-dead-center (TDC) position of the piston within the compressor cylinder based at least in part on a comparison of the evaluated property from the respective piston angle to a respective threshold;
remove data representing invalid piston angles from the revolution data set to form a refined data set;
determine an average piston angle for the single revolution from the refined data set;

identify the average piston angle representing a data value of the refined data set as the TDC position of the piston within the compressor cylinder; and adjust the refined data set to order the data value of the TDC position of the piston within the compressor cylinder to be a first data value in the refined data set;

wherein the at least one computing device is configured to identify the average piston angle as the TDC position of the piston within the compressor cylinder without the use of a phase-reference transducer.

2. The apparatus of claim 1, wherein the evaluated property comprises a compression ratio of the single revolution of the piston within the compressor cylinder.

3. The apparatus of claim 1, wherein the evaluated property comprises a volumetric efficiency of the single revolution of the piston within the compressor cylinder.

4. The apparatus of claim 1, wherein the evaluated property comprises a clearance volume of the single revolution of the piston within the compressor cylinder.

5. The apparatus of claim 1, wherein the asynchronous waveform includes a series of uniformly spaced time domain data points corresponding to measured pressures within the compressor cylinder.

6. The apparatus of claim 1, wherein the at least one computing device is configured to extract the revolution data set representing the piston angles over the single revolution using a threshold-hysteresis model.

7. The apparatus of claim 1, wherein the pressure transducer is operably connected with the at least one computing device via a wireless link.

8. A system comprising:
at least one computing device configured to identify a top-dead-center (TDC) position of a piston within a compressor cylinder by performing actions including:
extracting a revolution data set representing piston angles over a single revolution of a piston within a compressor cylinder from an asynchronous waveform indicating pressure inside the compressor cylinder;
evaluating a property corresponding to the pressure at each piston angle of the revolution data set;
determining whether each piston angle of the revolution data set is an invalid piston angle that does not correspond to the TDC position of the piston within the compressor cylinder based at least in part on a comparison of the evaluated property from the respective piston angle to a respective threshold;
removing data representing invalid piston angles from the revolution data set to form a refined data set; and
identifying a determined piston angle representing a data value of the refined data set as the TDC position of the piston within the compressor cylinder;
wherein the at least one computing device is configured to identify the average piston angle as the TDC position of the piston within the compressor cylinder without the use of a phase-reference transducer.

9. The system of claim 8, wherein the evaluated property comprises a compression ratio of the single revolution of the piston within the compressor cylinder.

10. The system of claim 8, wherein the evaluated property comprises a volumetric efficiency of the single revolution of the piston within the compressor cylinder.

11. The system of claim 8, wherein the evaluated property comprises a clearance volume of the single revolution of the piston within the compressor cylinder.

12. The system of claim 8, comprising:
determining an average piston angle for the single revolution from the refined data set;
identifying the average piston angle as the determined piston angle; and
adjusting the refined data set to order the data value of the TDC position of the piston within the compressor cylinder to be a first data value in the refined data set.

13. The system of claim 8, wherein the asynchronous waveform includes a series of uniformly spaced time domain data points.

14. The system of claim 8, wherein the at least one computing device is configured to extract the revolution data set representing the piston angles over the single revolution using a threshold-hysteresis model.

15. A non-transitory computer readable media comprising program code, which when executed on at least one computing device, causes the at least one computing device to identify a top-dead-center (TDC) position of a piston within a compressor cylinder by performing actions including:
obtaining an asynchronous waveform indicating measured pressures inside the compressor cylinder;
extracting a revolution data set representing piston angles over a single revolution of the piston within the compressor cylinder from the asynchronous waveform;
evaluating a property corresponding to the measured pressure at each piston angle of the revolution data set;
determining whether each piston angle of the revolution data set is an invalid piston angle that does not correspond to the TDC position of the piston within the compressor cylinder based at least in part on a comparison of the evaluated property from the respective piston angle to a respective threshold;
removing data representing invalid piston angles from the revolution data set to form a refined data set;
determining an average piston angle for the single revolution from the refined data set;
identifying the average piston angle as representing a data value of the refined data set as the TDC position of the piston within the compressor cylinder; and
adjusting the refined data set to order the data value of the TDC position of the piston within the compressor cylinder to be a first data value in the refined data set;
wherein the at least one computing device is configured to identify the average piston angle as the TDC position of the piston within the compressor cylinder without the use of a phase-reference transducer.

16. The non-transitory computer readable media of claim 15, wherein the evaluated property comprises a compression ratio of the single revolution of the piston within the compressor cylinder.

17. The non-transitory computer readable media of claim 15, wherein the evaluated property comprises a volumetric efficiency of the single revolution of the piston within the compressor cylinder.

18. The non-transitory computer readable media of claim 15, wherein the evaluated property comprises a clearance volume of the single revolution of the piston within the compressor cylinder.

19. The non-transitory computer readable media of claim 15, wherein the asynchronous waveform includes a series of uniformly spaced data points, and wherein the extracting of the revolution data set representing the piston angles over the single revolution includes using a threshold-hysteresis model.

* * * * *